(12) United States Patent
Bonke et al.

(10) Patent No.: US 6,420,022 B2
(45) Date of Patent: *Jul. 16, 2002

(54) DIFFERENTIAL CLING FORAGE WRAPPING FILM; WRAPPED BALE; METHOD FOR PRODUCING DIFFERENTIAL CLING FILM; AND METHOD FOR WRAPPING FORAGE

(75) Inventors: Douglas D. Bonke; Billie C. Munger, both of Appleton, WI (US)

(73) Assignee: Reynolds Consumer Products, Inc., Richmond, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,892

(22) Filed: Feb. 2, 1998

(51) Int. Cl.[7] .............................. B65B 27/12; B32B 7/12
(52) U.S. Cl. ..................... 428/355 EN; 428/343; 428/516; 426/635; 426/636; 53/399
(58) Field of Search ........................... 428/212, 515, 428/516, 343, 355 EN, 2; 53/399; 426/635, 636

(56) References Cited

U.S. PATENT DOCUMENTS

| | | | |
|---|---|---|---|
| 4,518,654 A | 5/1985 | Eichbauer et al. .......... 428/331 |
| 4,588,650 A | 5/1986 | Mientus et al. ............. 428/516 |
| 4,677,007 A | 6/1987 | Murray ........................ 428/35 |
| 4,680,207 A | 7/1987 | Murray ........................ 428/35 |
| 4,996,094 A | 2/1991 | Dutt ............................ 428/212 |
| 5,023,142 A | 6/1991 | Hetzler et al. .............. 428/500 |
| 5,154,981 A | * 10/1992 | Brant et al. ................. 428/520 |
| 5,169,728 A | 12/1992 | Murphy et al. ............. 428/516 |
| 5,175,049 A | 12/1992 | Huff et al. .................. 428/218 |
| 5,178,942 A | 1/1993 | Frognet et al. ........... 428/317.9 |
| 5,208,096 A | 5/1993 | Dohrer ....................... 428/218 |
| 5,273,809 A | 12/1993 | Simmons .................... 428/212 |
| 5,326,627 A | 7/1994 | Yazaki et al. ............... 428/216 |
| 5,334,428 A | 8/1994 | Dobreski et al. .......... 428/34.9 |
| 5,374,459 A | 12/1994 | Mumpower et al. ....... 428/36.7 |
| 5,399,426 A | 3/1995 | Koch et al. ................. 428/335 |
| 5,419,934 A | 5/1995 | Wilson ....................... 428/34.9 |
| 5,420,220 A | 5/1995 | Cheruvu et al. ......... 526/348.1 |
| 5,431,284 A | 7/1995 | Wilson ....................... 206/597 |
| 5,434,010 A | 7/1995 | Smith et al. ................ 428/526 |
| 5,443,866 A | 8/1995 | Murray ...................... 428/35.7 |
| 5,460,861 A | 10/1995 | Vicik et al. ................ 428/34.9 |
| 5,482,771 A | 1/1996 | Shah .......................... 428/349 |
| 5,491,019 A | 2/1996 | Kuo ........................... 428/213 |
| 5,569,693 A | 10/1996 | Doshi et al. ................ 524/317 |
| 5,617,707 A | 4/1997 | Simmons ...................... 53/441 |
| 5,658,625 A | 8/1997 | Bradfute et al. ........... 428/34.9 |
| 5,679,420 A | 10/1997 | Taguchi et al. ............ 428/34.1 |
| 5,679,422 A | 10/1997 | Lind et al. ................. 428/34.8 |
| 5,695,840 A | 12/1997 | Mueller ..................... 428/35.7 |
| 5,902,684 A | * 5/1999 | Bullard et al. ............. 428/515 |
| 5,922,441 A | * 7/1999 | Eichbauer .................. 428/213 |

OTHER PUBLICATIONS

"Amoco® Polybutene Physical Properties" brochure, Amoco Chemical Company/Bulletin 12–23, 1992.
American Society for Testing and Materials, "Standard Test Method for Peel Cling of Stretch Wrap Material," Annual Book of ASTM Standards, Aug. 1994, pp. 1–6.

(List continued on next page.)

Primary Examiner—D. Lawrence Tarazano
(74) Attorney, Agent, or Firm—Tracey D. Beiriger (57) ABSTRACT

A differential cling film is provided. The differential cling film includes a core layer having a first surface and a second surface. The core layer includes a polyethylene polymer. A high cling layer is provided covering the first surface of the core layer. The high cling layer includes an ultra low density polyethylene and a non-liquid tackifier. A low cling layer is provided covering the second surface of the core layer. The low cling layer includes polyolefin and non-liquid tackifier. A wrapped bale, a method for producing a differential cling film, and a method for wrapping forage is additionally provided.

46 Claims, 1 Drawing Sheet

OTHER PUBLICATIONS

"Eastoflex Amorphous Polyolefins" brochure, Eastman Chemical Company, Publciation WA–4B, Jan. 1993.

"Eastoflex Amorphous Polyolefins" brochure, Eastman Chemical Company, Publication WA–4D, Nov. 1995.

"Adhesives and Sealants Raw Materials" brochure, Eastman Chemical Company, Publication No. WA–16, Feb. 1992.

Dennis R. Buckmaster, "Round Bale Storage," Penn State College of Agricultural Sciences, I–112, 1993.

James W. Garthe, "Round Bale Silage," Penn State College of Agricultural Sciences, I–109, 1991.

R.P. Cromwell, W.E. Kunkle, G.D. Sadler, C.G. Cahmbliss, "The Plastic Wrapper is the Key to Making High Quality Round Bale Silage," University of Florida, Circular 1072, Jun. 1994, pp. 1–6.

R.P. Cromwell, W.E. Kunkle, C.G. Chambliss, "Equipment for Preserving Forage as Round–Bale Silage," University of Florida, Circular 1071, Apr. 1994, pp. 1–7.

W.E. Kunkle, R.P. Cromwell, C. G. Chambliss, D.B. Bates, J.G. Wasdin, "Experiences with Round Bale Silage," University of Florida, Oct. 1991.

R. P. Cromwell, W.E. Kunkle, G.D. Sadler, C.G> Chambliss, The Plastic Wrapper is the Key to Makting High Quality Round Bale Silage, (date unknown).

Dennis R. Buckmaster, "Forage Losses=Economic Losses, So Minimize Them," Penn State College of Agricultural Sciences, I–107, 1990, pp. 1–3.

"About Haywrap," Haywrap Inc., Copyright©1996, http://www.haywrap.com/product.htm, pp. 1–4.

"Before You Build A Hay Barn," Buchheit Building, http://www/haywrap.com/before.htm, pp. 1–2, Jun. 23, 1997.

"Economic Impact Per Bale for Spoilage," http://www.haywrap.com/economichay.htm, p. 1, Jun. 23, 1997.

"Machinery Cost Per Bale," http.//www.haywrap.com/machiner.htm, p. 1, Jun. 23, 1997.

"Nov 93 Round Bale Hay Storage Losses in Michigan," http.//www.ext.vt.edu/docdb/cses/cses–176, pp. 1–3.

"1996 World Dairy Expo Test Results," Hay Wrap Inc., http.//www.haywrap.com/haytest.htm, p. 1.

"Putting It Altogether," http://www.haywrap.com/putting.htm, p. 1, Jun. 1997.

"How Wet is Too Wet?," http://www.haywrap.com/howwetis.htm, p. 1, Jun. 1997.

"Bale Size . . . Large or Small . . . does it matter?," http://www.haywrap.com/balesize.htm, p. 1, Jun. 1997.

"Quality of Feed," http://www.haywrap.com/quality.htm., p. 1, Jun. 1997.

* cited by examiner

FIG. 1

DIFFERENTIAL CLING FORAGE WRAPPING FILM; WRAPPED BALE; METHOD FOR PRODUCING DIFFERENTIAL CLING FILM; AND METHOD FOR WRAPPING FORAGE

FIELD OF THE INVENTION

The invention relates to a differential cling forage wrapping film, a wrapped bale, a method for manufacturing a differential cling film, and a method for wrapping forage using a differential cling film.

BACKGROUND OF THE INVENTION

Packaging materials are available for agricultural products such as hay and other forage products for the production of silage. Forage wrapping films are generally intended to wrap forage products and hold or retain the moisture within the product. Forage wrapping films are different from conventional pallet wrapping films which are used to wrap non-agricultural, unitized loads. Pallet wrapping films generally exhibit much higher stretch and much lower cling than forage wrapping films. In addition, they generally are not required to withstand the conditions associated with being exposed to weather in a field for up to about 12 months.

Prior forage wrapping films can be categorized as either blown films or cast films. Exemplary blown forage wrapping films are available under the names BaleGard® from Presto Products Company of Appleton, Wis., Sunfilm® from AEP, and MaxTech™ from Tenneco, Inc. Blown forage wrapping films generally exhibit a large differential cling value between the outer surfaces of the film. For example, one surface of the film generally exhibits a very low cling value and the opposed surface of the film generally exhibits a very high cling value. It is understood that this generally results from the blowing process where a migratory cling additive migrates to the outer surface of the blown film.

A prior cast film is also available under the name Bale-Gard® from Presto Products Company of Appleton, Wis. This prior cast forage wrapping film can be categorized as a one side cling film. That is, one side of the film exhibits a high degree of cling, and the other side of the film exhibits essentially no cling.

For forage wrapping films, it is generally desirable to provide one side of the film with a high cling value. This property allows the film to stick to itself after it has been used to wrap a bale. The high cling side of the film faces inside when it wraps a bale. The reason for this is that if the high cling side were on the outside of the bale, the film would have a tendency to stick to other bales or to machinery. Forage wrapping films are generally provided in a roll form for use in wrapping bales. The high cling side is on the outside of the film when it is provided in roll form so that it does not stick to the machinery when it is used for wrapping bales.

Various methods have been disclosed to provide films having differential cling properties whereby one side of a wrap film exhibits strong cling properties while the other side of the film exhibits little or no cling properties. Three general techniques have been relied upon for providing films having differential cling properties. A first technique for providing a differential cling film include providing a laminate of at least two different polymer layers where one side of the film has the desired cling properties. This technique often involves the use of a tackifier and is described by U.S. Pat. No. 5,175,049 to Huff et al. Another technique for providing a differential cling film includes altering the cling properties of one side of the film by surface treatment (e.g., chemical, thermal, and/or electrical, such as corona discharge). A third technique involves the addition of tackifiers which are blended into the principal film polymer and the blend is then extruded and cooled as a film in such a way as to cause the tackifiers to exhibit differential cling properties when applied as wrap-packaging material.

SUMMARY OF THE INVENTION

A differential cling film is provided by the present invention. The differential cling film of the invention includes at least three layers. The first layer can be referred to as the core layer, the second layer can be referred to as the high cling layer, and the third layer can be referred to as the low cling layer. The high cling layer exhibits a same side cling value which is greater than the same side cling value of the low cling layer. Preferably, the high cling layer exhibits a same side cling value of between about 300 grams at 0% stretch and 550 grams at 100% stretch, and said low cling layer exhibits a same side cling value of between about 40 grams at 0% stretch and 125 grams at 100% stretch. The differential cling film preferably exhibits an opposite cling value in the range of between about 175 grams at 0% stretch and about 375 grams at 100% stretch. The same side and opposite side cling values are determined according to ASTM D5458-95.

In order to function properly as a forage wrapping film, the differential cling film of the invention should be sufficiently tough to resist puncturing and tearing. A preferred differential cling film exhibits a dart impact value according to ASTM D1709-91 of greater than about 150 grams, a MD tear value according to ASTM D1922-94 of greater than about 150 grams, and a TD tear value according to ASTM D1922-94 of between about 500 grams and about 800 grams.

The core layer of the differential cling film is primarily responsible for providing the desired toughness. On a mass basis, the core layer generally constitutes between about 70 percent and about 90 percent of the differential cling film. Preferably, the core layer includes polyethylene polymer. In order to increase toughness, the polyethylene polymer can be blended with an impact modifier. Preferred impact modifiers include polyethylene plastomer and ultra low density polyethylene. A preferred polyethylene plastomer is a metallocene catalyzed linear low density polyethylene.

The high cling layer preferably includes a blend of ultra low density polyethylene and non-liquid tackifier. The low cling layer preferably includes a blend of polyolefin and non-liquid tackifier. The non-liquid tackifier is preferably one which is solid at room temperature and atmospheric pressure, and is one which will not migrate through the film to other layers or to the surface of the film in an amount which will result in significant rubbing off of the tackifer onto the hands of the user. A preferred non-liquid tackifier is amorphous polyolefin, such as amorphous polypropylene.

A wrapped bale is provided by the present invention. The wrapped bale includes a forage product wrapped by a differential cling film. In general, the forage product is wrapped and left outdoors for several weeks to about one year. The purpose of the differential cling film is to retain much of the moisture within the forage product as the forage product converts to silage.

A method for producing a differential cling film is provided by the present invention. The method includes a step of providing at least three polymer melts and casting the three polymer melts to provide a multilayer film exhibiting differential cling properties. In a preferred embodiment, the first polymer melt includes a polyethylene polymer, the second polymer melt includes a blend of ultra low density polyethylene and non-liquid tackifier, and third polymer melt includes a blend of polyolefin and non-liquid tackifier.

A method for wrapping forage is provided by the present invention. The method includes steps of providing forage product in bale form, providing a differential cling film, and wrapping the bale with the differential cling film.

DETAILED DESCRIPTION OF THE PREFERRED EMBODIMENTS

The invention relates to differential cling, forage wrapping films. By "differential cling," it is meant that the cling properties on each side of the film are different. It should be understood that differential cling films of the invention include one side which is characterized as a low cling side and another side which is characterized as a high cling side. Many prior art differential cling films have one side which essentially exhibits no cling, and another side which exhibits high cling. The differential cling forage wrapping film of the invention preferably refers to a film having a low cling side and a high cling side. The cling property of the film generally refers to the surface characteristic which allows the film to adhere to itself. In the case of wrapping films, it is the opposite sides of the film which are generally the focus of the cling property of interest which allows the film to adhere to itself. The cling properties identified in this application are tested under the procedures of ASTM D 5458-95.

The differential cling, forage wrapping film of the invention is a multilayer film and can be referred to herein as the multilayer film, the forage wrapping film, or more simply as the film. The multilayer film includes a core layer and two outer layers. The core layer is primarily responsible for providing the desired strength properties. The outer layers are responsible for providing the differential cling properties. In particular, one of the outer layers can be referred to as the low cling layer, and the other outer layer can be referred to as the high cling layer. It should be understood that while the following description of the core layer focuses on a single core layer, the invention is not limited to a film having a single core layer. That is, the core layer can include several discrete layers which can be arranged in order to provide a "core layer" with the desired characteristics identified in this description. Accordingly, the reference to a "core layer" does not exclude the existence of additional layers within the multilayer film in addition to the outer layers. Reasons for providing the core layer as a laminate of two of more layers includes reducing material costs, reducing the use of certain expensive materials, providing a layer which can incorporate scrap or regrind materials, and enhancing the use of a particular material in order to provide desired properties.

In the context of the present invention, the film is designed for use a forage wrapping film which can be used in conjunction with conventional bale wrapping equipment. Conventional bale wrapping equipment is available from numerous manufacturers and distributors. The forage wrapping film should be provided in a form which can be used with as many of the commonly available bale wrapping equipment as possible. In general, the film is provided in a roll having a 20 inch or 30 inch width, 5,000 to 6,000 linear feet per roll, and the film is provided with a gauge of about 1 mil. The film is used to wrap bales of forage such as hay which is then provided in round or square bales and left in the field for up to a year. The film, therefore, has properties which allows it to function properly under outdoor conditions. In order to provide a film which will function as a forage wrapping film, certain physical properties of the film are desired. The physical properties primarily of interest for forage wrapping films include cling, puncture resistance, tear resistance, and tensile strength.

The cling properties of the forage wrapping film are described below in two ways. A first characterization of the cling values is by measuring the cling between the same surface of the film. This is referred to as same side cling. The second type of cling measurement measures the value of cling between opposite sides of the film. This cling measurement is referred to as opposite side cling. In the following description, the reference to the cling of a particular side of the film is a measurement of the same side cling value for that particular side. When the cling value is reported for the entire film, that cling value is an opposite side cling value. Furthermore, the cling properties are reported under conditions of both 0% stretch and 100% stretch. It is generally found that the cling properties are greatest at 0% stretch and then decrease with increasing stretch or elongation. Often, the decrease in cling with elongation is found to be roughly linear. When the values of clings are reported, they are intended to cover the values of cling at 0% stretch and at 100% stretch unless indicated otherwise.

It is believed that the low cling layer of the invention provides a same side cling value which is greater than the no cling layer of prior art differential cling films. Preferably, the same side cling value of the low cling layer is at least 40 grams at 0% stretch and at 100% stretch. If the cling of the low cling layer is too low, the film will not provide desired cling properties to adequately wrap a bale and keep it wrapped in outdoor conditions. It has been found that many prior art differential cling films which have a no-cling layer tend to unravel or unwrap after the wrapped bales and are left in the field over time. The low cling layer should not exhibit a cling value which is high enough to interfere with equipment use when wrapping bales or which tends to prevent the roll of film unwinding. Accordingly, the same side cling value for the low cling layer should be less than about 130 grams at 0% stretch and at 100% stretch. Preferably, the low cling layer exhibits a low cling value of between about 50 grams and about 125 grams, and more preferably between about 70 grams and about 110 grams.

The high cling layer should exhibit sufficient cling so that when the wrapped bales are left in the field, they do not tail. That is, the ends of the film do not separate and flap in the wind. It is desirable to prevent tailing in order to reduce the amount of moisture which escapes from the bale. It is believed that tailing or edge release of the film layers contributes to loss of moisture from the wrapped bales or spoilage of the contents of the bale. In addition, the cling value of the high cling layer should not be so high as to create blocking or unwinding problems when the film is used for wrapping forage. The potential problem of blocking is a particular concern at elevated temperatures such as above 90° F. A preferred range of same side cling for the high cling layer is between about 300 grams and about 550 grams at 0% stretch and at 100% stretch. More preferably, the range of same side cling is between about 350 grams and about 450 grams, and more preferably, between about 375 grams and about 425 grams.

The differential cling forage wrapping film of the invention should exhibit an opposite side cling value which is sufficient to reduce tailing effect and provide desired cling at elevated temperatures, but which is not too aggressive and which would be difficult to use on conventional bale wrapping equipment. In general, this corresponds to an opposite side cling value in the range of between about 175 grams at 0% stretch and 100% stretch and about 375 grams at 0% stretch and 100% stretch. Preferably, the opposite side cling value for the film is between about 200 grams and 350 grams.

The differential cling film should have a toughness which resists puncture holes caused by forage during wrapping. After wrapping, the film must be sufficiently tough to resist punctures and tearing under conditions of weathering normally encountered when bales of forage are placed in a field for up to about 12 months. The toughness of the film can be characterized in terms of properties called dart impact, MD tear, TD tear, and tensile strength.

The differential cling film of the invention preferably has a dart impact value as determined by ASTM D1709-91 of greater than about 150 grams. The upper value on the dart impact is generally a function of cost. While higher dart impact values can be obtained by the selection of certain materials as discussed below, it is expected that providing dart impact values of greater than about 1,000 grams may be non-economical. Preferably, the dart impact value of the film of the invention is between about 175 grams and about 275 grams.

The differential cling forage wrapping film of the invention is preferably prepared by casting techniques. In general, casting techniques result in a film which is stretched uniaxially in the machine direction. This is in contrast to blown films which are stretched biaxially. Prior art cast films, therefore, generally exhibit lower tear resistance along the machine direction compared with blown films. It is a discovery of the present invention that the tear resistance in the machine direction of cast films can be improved. Resistance to splitting in the machine direction is particularly important for a forage wrapping film. After the film has wrapped a bale of forage, the bales are often dropped from the bed of the bale wrapper. If the tear resistance in the machine direction is too low, the film will sometimes split. In addition, when bales are stacked, the bales provided at the bottom of the stack are under increased pressure which may cause the film to split along the machine direction. If the tear resistance in the machine direction is too low, it has been found that certain films may zipper or tear in the machine direction after the film has been punctured. Resistance to tearing in the transverse direction is generally important so that the film does not rip during the wrapping process.

The tear properties of the differential cling film can be determined by ASTM D1922-94. In general, it is desirable to provide an MD tear value of greater than about 150 grams. While it can be expensive to provide higher MD tear values, it is expected that the MD tear value of the invention will be kept generally below about 500 grams. Preferably, the MD tear of the differential cling film is between about 200 grams and about 300 grams.

For the differential cling film of the invention, is expected that the TD tear property will be between about 500 grams and about 800 grams. Preferably, the TD tear property will be between about 550 grams and about 650 grams. It is an advantage of the invention that the differential cling film can be provided with greater balance between the MD tear and the TD tear properties compared with prior art cast films. By balancing the MD tear and TD tear properties, it is less likely that the film will split in one direction.

The tensile and elongation properties of forage wrapping films are often considered important by purchasers of the film. For the forage wrapping film of the invention, the tensile and elongation properties are generally closely associated with the tear properties of the film. In general, it is desirable for the film to exhibit a tensile strength of between about 4,500 psi and about 8,000 psi according to ASTM D882. If the tensile strength (MD) is too high, it is expected that the film will exhibit undesirable tear properties. The forage wrapping film should exhibit an elongation of at least about 300% in the machine direction and 400% in the transverse direction as measured by ASTM D882. The forage wrapping film should not reach its ultimate elongation in either the machine direction or the transverse direction under normal forage wrapping directions. The tensile strength (TD) should be between about 4,000 psi and about 6,000 psi.

Forage wrapping films require high cling properties in order to function in an outdoor environment, but also require good release properties to allow the film to unwind during baling applications. The release properties for pallet wrapping films is generally not considered to be a very important property. Typical pallet wrapping equipment can tolerate the use of pallet wrapping films which exhibit poor release. In contrast, most bale wrapping equipment is not as sophisticated as pallet wrapping equipment, and, therefore, consideration of release properties of the film is important. The forage wrapping film of the invention preferably exhibits a release value which is less than about 0.2 lb. for separating two 4 inch wide films at an extension of 20 inches per minute. The test procedure for determining release is described in detail in Example 1. A target release value for the forage wrapping film of the invention is between about 0.05 lb. and about 0.1 lb. for separating two 4 inch wide films at an extension of 20 inches per minute. In contrast, many pallet wrapping films can function adequately exhibiting release values of greater than 0.2 lb. for separating two 4 inch wide films at an extension of 20 inches per minute.

Film Components

The differential cling film of the invention can be referred to as an ABC film because each layer of the film is provided with a different chemical composition. The high cling layer of the differential cling film can be referred to as the A layer. This is the layer which will contact the forage when used to wrap bales. The core layer can be referred to as the B layer, and the low cling layer can be referred to as the C layer. It should be appreciated that while the core layer is discussed in reference to the B layer, it should be understood that the core layer can include a mutlilayer structure. That is, the core layer can be a laminate of two or more layers.

The primary polymer component of forage wrapping film is polyethylene. The term "polyethylene" is intended to encompass polyethylene homopolymers and copolymers of ethylene which may be random or block copolymers, and includes all plastic resins which are commonly known as high density polyethylene, low density polyethylene, linear low density polyethylene, ultra low density polyethylene, medium low density polyethylene, polyethylene plastomers or elastomers, and blends thereof.

The preferred low density polyethylene polymer (LDPE) used in the film is produced by a low pressure process wherein a major proportion by weight of ethylene is copolymerized with a minor proportion by weight of an alpha olefin monomer containing 4 to 10 carbon atoms. It should be understood that low density polyethylene polymer exhibits a melt index of less than about 10, as determined using the industry recognized standard test method, ASTM 1238 (Standard Test Method for Flow Rates of Thermoplastics by Extrusion Plastometer). The low density polyethylene polymer has a density ranging from about 0.86 to about 0.94 gm/c.c. and a melt index of from about 0.5 to about 10.

There are generally five types of low density polyethylene polymers which are commercially available. These include linear low density polyethylene (LLDPE), ultra low density polyethylene (ULDPE), medium density polyethylene (MLDPE), polyethylene plastomer (PEP), and high pressure low density polyethylene (HPLDPE). For purposes of the present invention, these types of polymers can be distinguished based upon their density. It should be understood that under the definitions of the various types of low density polyethylene, a particular polymer may satisfy one or more types of low density polymer. In general, linear low density polyethylene exhibits a density within the range of from about 0.915 to 0.924 gm/c.c. Ultra low density polyethylene exhibits a density within the range of from about 0.903 to 0.915 gm/c.c. Medium density polyethylene exhibits a density which is greater than about 0.925 gm/c.c. Polyethylene plastomers generally have a density of between about 0.86 and 0.91 gm/c.c. High pressure low density polyethylene generally exhibits a density of between about 0.920 and about 0.935 gm/c.c.

By the use of the term minor proportion by weight of an alpha olefin monomer is meant a proportion which does not exceed the proportion, by weight, of ethylene present in the copolymer, in other words, a proportion of alpha olefin monomer less than 50 weight percent. Preferably the ethylenic copolymers employed are those having from about 1 to about 20 weight percent of the higher alpha olefin monomer copolymerized therein. In addition, it is also preferred that the alpha olefin monomer employed in the ethylenic copolymer be selected from the group consisting of butene-1, 3-methyl-butene-1, 3-methyl-pentene-1, -hexene-1, 4-methyl-pentene-1, 3-methyl-hexene-1, octene-1 and decene-1. Preferred, particularly for use in the outer layers of the multilayer film structures of the present invention, are LDPE resins formed using the hexene-1 alpha or octene-1 olefins. Particularly preferred resins for use in forming the core layer of the multilayer film structures of the present invention are the ethylenic copolymers employing hexene-1 and octene-1 alpha olefins. These particularly preferred core layer resins offer improved strength and puncture resistance to the multilayer structures of the present invention. The LDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LDPE resins including those which are particularly useful herein.

The Core Layer

The core layer of the differential cling film is generally the component of the film primarily responsible for providing the desired strength and toughness. The toughness of the differential cling film of the invention can mainly be attributed to the core layer. In general, the core layer makes up about 70 percent to about 90 percent of the total thickness of the differential cling film, on a mass basis. Preferably, the core layer makes up between about 75 percent and about 85 percent of the thickness of the differential cling film, on a mass basis. Each of the outer layers make up between about 5 percent and 15 percent of the total thickness of the differential cling film, on a mass basis. The thickness of the outer layer should be sufficient to impart the desired cling properties.

Bale wrapping films conventionally have a thickness of about 1 mil. It has been found that this thickness is desired by users of conventional bale wrapping equipment. The differential cling film of the invention can be provided with a thickness of between about 0.5 mil and about 2.5 mil. If the thickness of the film decreases to below about 0.5 mil, it is expected that the film will not provide the desired toughness. If the thickness is greater than about 2.5 mil, it is expected that the film may not provide the desired degree of stretch which assists in wrapping the bales tightly. Most conventional bale wrapping equipment is designed for using a film which can be wrapped to provide 4 layers of film with 50 percent overlap. For use in this type of application, it is desired that the differential cling film of the invention have a thickness of between about 0.8 mil and about 1.5 mil.

The core layer includes polymer and, optionally, pigment, and/or UV additive. The core layer includes at least about 95 percent, by weight, based on the entire core layer, of polymer component. Preferably, the core layer includes at least about 97 percent by weight of polymer component. The non-polymer component of the core layer, if present at all, is primarily pigment and UV additive. The pigment is generally provided in an amount of between about 2 percent and about 5 percent by weight based upon the total composition of the core layer. The UV additive is provided in an amount of less than 5,000 ppm.

The polymer component of the core layer includes linear low density polyethylene and impact modifier. The impact modifier is provided in an amount sufficient to provide the desired tear strength and puncture resistance properties. Too much impact modifier will provide a film which is too soft. In addition, it is generally desirable to limit the amount of impact modifier in the core layer because it is an expensive component. Two types of impact modifiers which can be used in the polymer component of the core layer include plastomer and ultra low density polyethylene. The preferred impact modifier is the polyethylene plastomer. It is generally desirable to provide at least about 10 percent by weight based upon the polymer component, and less than about 25 percent by weight based upon the polymer component of the polyethylene plastomer. More preferably, the polyethylene plastomer is provided in an amount of between about 15 percent by weight and about 20 percent by weight, based on the polymer component. A preferred polyethylene plastomer is a metallocene catalyzed linear low density polyethylene such as the resin available under the name DOW PL1845 from Dow Chemicals Company. The ultra low density polyethylene component can be used as a partial or complete substitute for the polyethylene plastomer component. In general, it is expected that the ultra low density polyethylene component can be used in an amount of up to about 30 percent by weight based on the total weight of the polymer component. Preferably, the ultra low density polyethylene, if present at all, is present in an amount of between about 10 percent by weight and about 20 percent by weight of the polymer component.

The linear low density polyethylene can be present in the polymer component of the core layer in an amount of up to about 90 percent by weight based on the weight of the polymer component. The linear low density polyethylene can be provided as a blend of two different linear low density polyethylene resins. For example, it may be desirable to blend in another linear low density polyethylene which may be less expensive. Other polymer components can be blended in as partial substitutes for the linear low density polyethylene in order to enhance stiffness. It has been found that increasing stiffness helps to reduce neck down when unwinding the film. Medium density polyethylene and/or high pressure low density polyethylene may be introduced in an amount of up to about 30 percent by weight based upon the total weight of the polymer component. In general, if either of these polymers is used, it is expected that they will be used somewhere in the range of about 10 percent by weight to about 20 percent by weight based on the total weight of the polymer component. In addition, polypropylene is another polymer additive which can be introduced to enhance stiffness. If polypropylene is used, it is expected that it will be used in amount of less than about 10 percent by weight based on the total weight of the polymer component.

The UV additive is provided to inhibit degradation of the film. UV additives which can be used in the present invention are generally known in the art.

A pigment can additionally be incorporated into the core layer to provide the desired color for the differential cling film. In most applications, it is desired to provide a bale wrapping film which is either white or black. Pigments which can be used in the present invention are generally known in the art. Alternatively, the differential cling film can be provided without any pigment in order to provide a clear film.

The High Cling Layer And The Low Cling Layer

The high cling layer and the low cling layer are provided in the forage wrapping film of the invention in order to provide differential cling. In general, the high cling layer and the low cling layer should provide the cling properties discussed above.

The high cling layer preferably includes an ultra low density polyethylene and a non-liquid tackifier. A non-liquid tackifier is generally a tackifier which is not liquid under ambient conditions of room temperature and atmospheric pressure. In addition, a non-liquid tackifier is generally considered nonmigratory in the final product. That is, it tends not to migrate through the film, and tends not to migrate into the core layer. In contrast, migratory tackifiers such as polybutenes and polyisobutylenes tend to migrate. In many prior art blown films, the liquid tackifier blooms or migrates to the outer surface of the film during the blowing process to create differential cling. Prior art film which incorporates liquid tackifiers often suffers from the problem of having tackifier rub off onto a user's hands.

It is understood that the ultra low density polyethylene provides a portion of the cling properties of the high cling layer. In order to further enhance the cling properties, a non-liquid tackifier is added which is compatible with the ultra low density polyethylene. The ultra low density polyethylene and non-liquid tackifier are preferably adjusted so that the high cling layer provides sufficient cling as described above, but not too much cling to cause sticking to equipment. It should be understood that the ultra low density polyethylene can be provided as a single resin or as a blend of one or more ultra low density polyethylene resins.

The non-liquid tackifier is preferably an amorphous polyolefin and is provided in the high cling layer in an amount of between about 1 percent by weight and about 15 percent by weight based on the total weight of the high cling layer. It should be understood that the particular amount of amorphous polyolefin is selected based upon its compatibility with the ultra low density polyethylene and the desired cling value for that layer. Preferably, the amorphous polyolefin is provided in an amount of between about 2 percent by weight and about 10 percent by weight based on the total weight of the high cling layer, and more preferably between about 3 percent by weight and about 6 percent by weight based on the total weight of the high cling layer. Exemplary amorphous polyolefins which can be used in the high cling layer are available under the name EASTOFLEX from Eastman Chemicals Company. A preferred amorphous polyolefin is amorphous polypropylene homopolymer which can be obtained under the name EASTOFLEX P1023 from Eastman Chemicals Company.

Amorphous polyolefins generally exhibit poor flow properties in their solid state due to their high tack. Accordingly, concentrates of amorphous polyolefin in linear low density polyethylene can be obtained having desired flow characteristics. These desired flow characteristics will allow ease of blending in conventional gravimetric blending equipment and will avoid potential bridging problems in the extruder. Bridging is generally exhibited by premature melting in the feed section of an extruder. An exemplary concentrate is COLORTECH 10511-71 from Colortech, Inc. Applicants have found that the linear low density polyethylene blended with the amorphous polyolefin does not provide detrimental effects when blended into the high cling layer.

The low cling layer is provided as a blend of polyolefin and non-liquid tackifier. In general, the polyolefin should have a density which is higher than the polyolefin provided in the high cling layer. This is to provide a lower cling value. The non-liquid tackifier component of the low cling layer can be those components identified above with respect to the high cling layer, and can be provided in the previously identified concentrations. A preferred non-liquid tackifier is the amorphous polypropylene homopolymer available under the name EASTOFLEX P1023 from Eastman Chemicals Company. Preferably, the non-liquid tackifier is provided in the low cling layer in an amount ranging between about 1 percent and about 15 percent by weight of the low cling layer, and more preferably, between about 2 percent and about 10 percent by weight.

The polyolefin component of the low cling layer is preferably a low density polyethylene having a density of greater than about 0.920 gms/c.c. Preferably, the polyolefin component is a medium density polyethylene. Alternative polyolefin components include: a blend of high pressure low density polyethylene and medium density polyethylene; a blend of polypropylene and medium density polyethylene; and high pressure low density polyethylene. The low cling layer can additionally include small amounts of low density polyethylene polymer which is incorporated via the concentrate of amorphous polyolefin.

Figure 1:
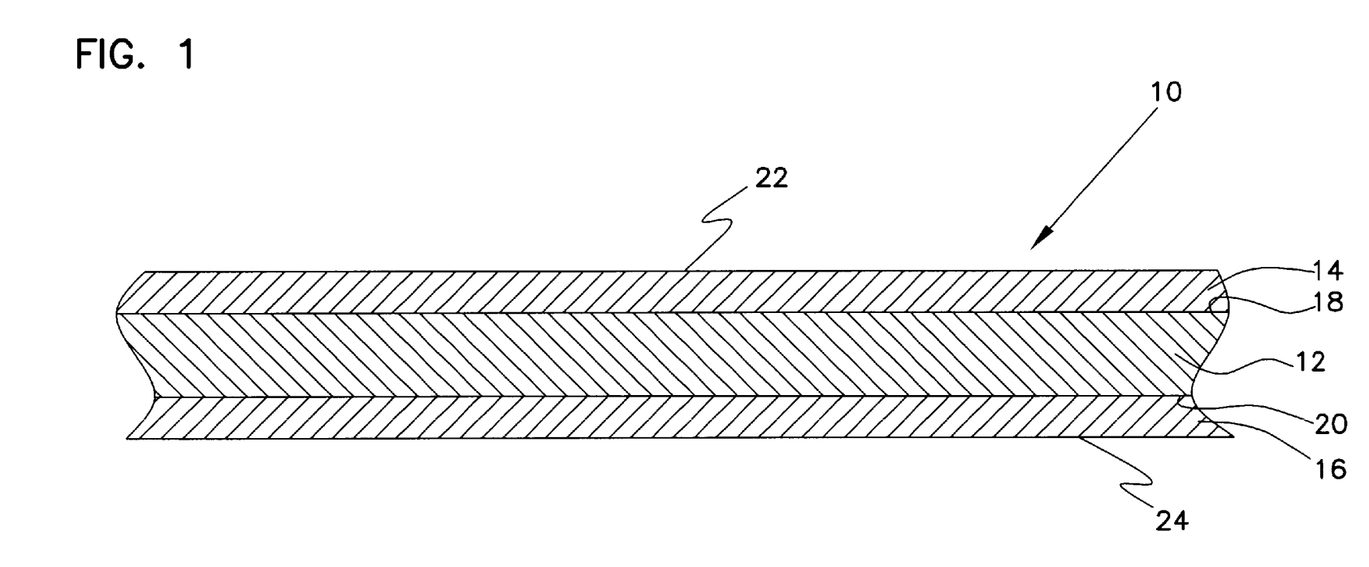
FIG. 1 is a sectional view of a differential cling forage wrapping film according to the principles of the present invention.

Now referring to FIG. 1, a differential cling forage wrapping film according to the present invention is indicated at reference numeral 10. The forage wrapping film 10 includes a core layer 12, a high cling layer 14, and a low cling layer 16. The high cling layer 14 covers the first surface 18 of the core layer, and the low cling layer 16 covers the second surface 20 of the core layer 12. The high cling layer 14 includes a high cling surface 22, and the low cling layer 16 includes a low cling surface 24. When the cling of the forage wrapping film is identified, this is the cling resulting from the contact between the high cling surface 22 and the low cling surface 24. This type of cling has been identified as opposite side cling. Same side cling generally refers to, for example, the cling between different parts of the high cling surface 22, or the cling provided between different parts of the low cling surface 24.

Applicants have found that by using a non-liquid tackifier, it is not necessary to wait for the film to age. When conventional liquid tackifiers are used, which is the situation in most blown films, the film requires an aging period where the liquid tackifier blooms or migrates to the surface of the film. Because of this migration, the liquid tackifiers tend to provide films with inconsistent tack properties particularly over wide temperature applications.

Casting Technique

An advantage of the invention is that the forage wrapping film is prepared by casting. Casting procedures generally allow higher outputs and better gauge control compared with blown film processes.

Casting techniques which can be used to provide the forage wrapping film of the present invention are generally described in *Quantum, A Guide to Polyolefin Film Extrusion*, Copyright 1991, the disclosure of which is incorporated herein by reference. In general, the components of each of the layers are provided in a separate extruder, melted and extruded. The melt then flows from each of the extruders through a combining block and into a die. The melt in the die is forced through an orifice and into a sheet or web which falls onto a chill roll. The distance between the die orifice and the chill roll is usually between about 1 inch and 5 inches. The sheet or web is then slit and wound onto either the 20 inch roll or the 30 inch roll.

Round or square (rectangular) bales can be wrapped with the forage wrapping film of the invention following the well-known forage wrapping procedures which utilize conventional forage wrapping equipment. Bale wrapping techniques are described, for example, by Cromwell et al., "Equipment for Preserving Forage as Round-Bale Silage," University of Florida Institute of Food and Agricultural Sciences, April 1994; Cromwell et al., "The Plastic Wrapper is the Key to Making High Quality Round Bales Silage," University of Florida Institute of Food and Agricultural Sciences, June 1994; Garth, "Round Bale Silage," Penn State College of Agricultural Sciences, 1991; and Buckmaster, "Round Hay Bale Storage," Penn State College of Agricultural Sciences, 1993; the disclosures of which are incorporated herein by reference.

EXAMPLE 1

Film Release Properties

Films 1–4 were obtained and tested for film release properties. Film 1 is a cast film sold under the name BaleGard® by Presto Products Company. Film 3 is a blown film sold under the name Sunfilm® by AEP, and Film 4 is blown film sold under the name MaxTech™ by Tenneco. Film 2 is a forage wrapping film according to the present invention. Film 2 was prepared by casting to provide an ABC film. It should be understood that the percentage of each layer is on a mass basis.

10.0% A LAYER:
  15% Colortech 10511-71
  85% Dow 2032
80.0% B LAYER:
  5% Equistar CM82288
  95% (3.0% Equistar PM12295
  17.0% Dow PL 1845
  20.0% Dow 2032
  60.0% Dow NG3347A)
10.0% C LAYER:
  10% Colortech 10511-71
  90% Dow 4404

TABLE 1

FILM RELEASE

| Film | Lbs to pull film apart* | 20" roll | 30" roll |
|---|---|---|---|
| Film 1 | 0.45 | 2.25 | 3.38 |
| Film 2 | 0.08 | 0.4 | 0.6 |
| Film 3 | 0.12 | 0.6 | 0.9 |
| Film 4 | 0.10–0.12 | 0.5–0.6 | 0.75–0.9 |

*Test was conducted by pulling apart 2 layers of 4" wide film at 20"/min. Angle between the layers of film being pulled apart is 180 degrees. Calculated values for a 20" and 30" roll are a simple linear extrapolation.

The release properties for each film were determined by the following test. Rolls of each film were provided. Two layers of films were slabbed from each roll. The layers were not separated. The slab film was cut into 8 inch by 4 inch sections wherein the 8 inch section was along the machine direction. The top 2 inches of the two layers of film (across the 4 inch width) was separated. Tape was then applied to the edges of the separated layers and the separated layers were placed in the grips of a tensile tester. The test was run at an extension of 20 inches per minute to separate the layers. The resulting value is the release value in lbs. This test is an attempt to provide data for essentially a no-load condition of operation. The release values for the 20 inch roll and the 30 inch roll were calculated based upon the release values identified in this test.

We claim:
1. A wrapped bale comprising:
  forage product wrapped by a differential cling film, wherein said differential cling film comprises:
    core layer having a first surface and a second surface, the core layer comprising a polyethylene polymer;
    high cling layer covering the first surface of the core layer, the high cling layer comprising ultra low density polyethylene and tackifier, the tackifier comprising amorphous polyolefin and being non-liquid under conditions of room temperature and atmospheric pressure, the high cling layer exhibits a same side cling value of between 300 grams and 550 grams at 0% stretch and at 100% stretch according to ASTM- D5458-95; and
    low cling layer covering the second surface of the core layer, the low cling layer comprising polyolefin and tackifier, the tackifier comprising amorphous polyolefin and being non-liquid under conditions of room temperature and atmospheric pressure the low cling layer exhibits a same side cling value of between 40 grams and 130 grams at 0% stretch and at 100% stretch according to ASTM D5458-95, wherein the differential cling film exhibits a TD tear value of between 500 grams and about 800 grams according to ASTM 1922-94.

2. A wrapped bale according to claim 1, wherein the tackifier in said high cling layer comprises amorphous polypropylene, and the tackifier in said low cling layer comprises amorphous polypropylene.

3. A wrapped bale according to claim 1, wherein the tackifier in the high cling layer comprises amorphous polypropylene homopolymer and the tackifier in the low cling layer comprises amorphous polypropylene homopolymer.

4. A wrapped bale according to claim 1, wherein the high cling layer exhibits a same side cling value of between 350 grams and 450 grams at 0% stretch and at 100% stretch according to ASTM D5458-95.

5. A wrapped bale according to claim 1, wherein the high cling layer exhibits a same side cling value of between 375 grams and 425 grams at 0% stretch and at 100% stretch according to ASTM D5458-95.

6. A wrapped bale according to claim 1, wherein:
the low cling layer exhibits a same side cling value of between about 70 grams and about 110 grams at 0% stretch and at 100% stretch according to ASTM D5458-95.

7. A wrapped bale according to claim 1, wherein the low cling layer exhibits a same side cling value of between 50 grams and 125 grams at 0% stretch and at 100% stretch according to ASTM D5458-95.

8. A wrapped bale according to claim 1, wherein:
the differential cling film provides an opposite side cling value in the range of between 175 grams and 375 grams at 0% stretch and at 100% stretch according to ASTM D5458-95.

9. A wrapped bale according to claim 1, wherein the differential cling film exhibits an opposite side cling value of between 200 grams and 350 grams at 0% stretch and at 100% stretch according to ASTM D5458-95.

10. A wrapped bale according to claim 1, wherein the core layer comprises about 70% to about 90% of the total thickness of the differential cling film on a mass basis.

11. A wrapped bale according to claim 1, wherein the core layer comprises about 75% to about 85% of the total thickness of the differential cling film on a mass basis.

12. A wrapped bale according to claim 1, wherein the high cling layer and the low cling layer each comprise between about 5% and about 15% of the thickness of the differential cling film on a mass basis.

13. A wrapped bale according to claim 1, wherein the differential cling film has a thickness of between 0.5 mil and about 2.5 mil.

14. A wrapped bale according to claim 1, wherein the differential cling film has a thickness of between about 0.8 mil and about 1.5 mil.

15. A wrapped bale according to claim 1, wherein the core layer comprises about 2 wt. % to about 5 wt. % pigment based on the weight of the core layer.

16. A wrapped bale according to claim 1, wherein the core layer comprises a UV additive in an amount of less than 5,000 ppm.

17. A wrapped bale according to claim 1, wherein the high cling layer comprises between about 1 wt. % to about 15 wt. % of the amorphous polyolefin.

18. A wrapped bale according to claim 1, wherein the high cling layer comprises between about 2 wt. % to about 10 wt. % of the amorphous polyolefin.

19. A wrapped bale according to claim 1, wherein the high cling layer comprises between about 3 wt. % to about 6 wt. % of the amorphous polyolefin based on the weight of the high cling layer.

20. A wrapped bale according to claim 1, wherein the low cling layer comprises between about 1 wt. % to about 15 wt. % of the amorphous polyolefin based on the weight of the low cling layer.

21. A wrapped bale according to claim 1, wherein the low cling layer comprises between about 2 wt. % to about 10 wt. % of the amorphous polyolefin based on the weight of the low cling layer.

22. A wrapped bale according to claim 1, wherein the differential cling film exhibits a dart impact value of greater than about 150 grams according to ASTM D1709-91.

23. A wrapped bale according to claim 1, wherein the differential cling film exhibits a MD tear value of greater than about 150 grams according to ASTM D1922-94.

24. A method of wrapping forage, said method comprising steps of:
(a) providing forage product in bale form;
(b) providing a differential cling film comprising:
core layer having a first surface and a second surface, the core layer comprising a polyethylene polymer;
high cling layer covering the first surface of the core layer, the high cling layer comprising ultra low density polyethylene and tackifier, the tackifier comprising amorphous polyolefin and being non-liquid under conditions of room temperature and atmospheric pressure, wherein said high cling layer exhibits a same side cling value of between 300 grams and 550 grams at 0% stretch and at 100% stretch according to ASTM D5458-95;
low cling layer covering the second surface of the core layer, the low cling layer comprising polyolefin and tackifier, the tackifier comprising amorphous polyolefin and being non-liquid under conditions of room temperature and atmospheric pressure, wherein said low cling layer exhibits a same side cling value of between 40 grams and 130 grams at 0% stretch and at 100% stretch according to ASTM D5458-95; and
(c) wrapping said bale with said differential cling film, wherein the differential cling film exhibits a TD tear value of between about 500 grams and about 800 grams according to ASTM D1922-94.

25. A method for wrapping forage according to claim 24, wherein the tackifier in said high cling layer comprises amorphous polypropylene, and the tackifier in said low cling layer comprises amorphous polypropylene.

26. A method for wrapping forage according to claim 24, wherein the low cling layer exhibits a same side cling value of between 50 grams and 125 grams at 0% stretch and at 100% stretch according to ASTM D5458-95.

27. A method for wrapping forage according to claim 24, wherein the differential cling film provides an opposite side cling value in the range of between 175 grams and 375 grams at 0% stretch and at 100% stretch according to ASTM D5458-95.

28. A method for wrapping forage according to claim 24, wherein the differential cling film provides an opposite side cling value in the range of between 200 grams and 350 grams at 0% stretch and at 100% stretch according to ASTM D5458-95.

29. A method for wrapping forage according to claim 24, wherein the tackifier in the high cling layer comprises amorphous polypropylene homopolymer and the tackifier in the low cling layer comprises amorphous polypropylene homopolymer.

30. A method for wrapping forage according to claim 24, wherein the core layer comprises about 70% to about 90% of the total thickness of the differential cling film on a mass basis.

31. A method for wrapping forage according to claim 24, wherein the core layer comprises about 75% to about 85% of the total thickness of the differential cling film on a mass basis.

32. A method for wrapping forage according to claim 24, wherein the high cling layer and the low cling layer each comprise between about 5% and about 15% of the thickness of the differential cling film on a mass basis.

33. A method for wrapping forage according to claim 24, wherein the differential cling film has a thickness of between about 0.5 mil and about 2.5 mil.

34. A method for wrapping forage according to claim 24, wherein the differential cling film has a thickness of between about 0.8 mil and about 1.5 mil.

35. A method for wrapping forage according to claim 24, wherein the core layer comprises about 2 wt. % to about 5 wt. % pigment based on the weight of the core layer.

36. A method for wrapping forage according to claim 24, wherein the core layer comprises a UV additive in an amount of less than 5,000 ppm.

37. A method for wrapping forage according to claim 24, wherein the high cling layer comprises between about 1 wt. % and about 15 wt. % of the amorphous polyolefin.

38. A method for wrapping forage according to claim 24, wherein the high cling layer comprises between about 2 wt. % and about 10 wt. % of the amorphous polyolefin.

39. A method for wrapping forage according to claim 24, wherein the high cling layer comprises between about 3 wt. % and about 6 wt. % of the amorphous polyolefin based on the weight of the high cling layer.

40. A method for wrapping forage according to claim 24, wherein the low cling layer comprises between about 1 wt. % and about 15 wt. % of the amorphous polyolefin based on the weight of the low cling layer.

41. A method for wrapping forage according to claim 24, wherein the low cling layer comprises between about 2 wt. % and about 10 wt. % of the amorphous polyolefin based on the weight of the low cling layer.

42. A method for wrapping forage according to claim 24, wherein the differential cling film exhibits a dart impact value of greater than about 150 grams according to ASTM D1709-91.

43. A method for wrapping forage according to claim 24, wherein the differential cling film exhibits a MD tear value of greater than about 150 grams according to ASTM D1922-94.

44. A method for wrapping forage according to claim 24, wherein the step of wrapping said bale with said differential cling film comprises wrapping to provide at least 50% overlap.

45. A method for wrapping forage according to claim 24, wherein the step of wrapping comprises stretching the differential cling film up to 100%.

46. A differential cling film for wrapping forage comprising:

a core layer having a first surface and a second surface, the core layer comprising a polyethylene polymer, between about 2 wt. % and about 5 wt. % of a pigment based upon the weight of the core layer and a UV additive in an amount of less than about 5,000 ppm, wherein the core layer comprises 70% to 90% of the total thickness of the differential cling film on a mass basis;

a high cling layer covering the first surface of the core layer, the high cling layer comprising ultra low density polyethylene and a tackifier, the tackifier comprising amorphous polyolefin homopolymer in an amount of between about 2 wt. % and about 10 wt. % based on the weight of the high cling layer, the tackifier being non-liquid under conditions of room temperature and atmospheric pressure; and the high cling layer comprising between about 5 wt. % and about 15 wt. % of the total thickness of the differential cling film on a mass basis; and a low cling layer covering the second surface of the core layer, the low cling layer comprising polyolefin and a tackifier, the tackifier comprising amorphous polypropylene homopolymer in an amount of between about 2 wt. % and about 10 wt. % based on the weight of the low cling layer, the tackifier being non-liquid under conditions of room temperature and atmospheric pressure, and the low cling layer comprising between about 5% and about 15% of the total thickness of the differential cling film on a mass basis;

the high cling layer exhibiting a same side cling value of between 375 grams and 425 grams at 0% stretch and at 100% stretch according to ASTM D5458-95;

the low cling layer exhibiting a same side cling value of between 70 grams and 110 grams at 0% stretch and at 100% stretch according to ASTM D5458-95;

the differential cling film exhibiting an opposite side cling value of between 200 grams and 350 grams at 0% stretch and at 100% stretch according to ASTM D5458-95;

the differential cling film exhibits an dart impact value of greater than 150 grams according to ASTM D1709-91;

the differential cling film exhibits an MD tear value of greater than 150 grams according to ASTM D1922-94; and the differential cling film exhibits a TD tear value of between 500 grams and 800 grams according to ASTM D1922-94.

* * * * *